United States Patent [19]

Gray, Sr.

[11] Patent Number: 4,595,975
[45] Date of Patent: Jun. 17, 1986

[54] EFFICIENT POWER SUPPLY SUITABLE FOR INDUCTIVE LOADS

[76] Inventor: Edwin V. Gray, Sr., P.O. Box 362, Council, Id. 83612

[21] Appl. No.: 662,339

[22] Filed: Oct. 18, 1984

[51] Int. Cl.$^4$ ............................................. H02M 3/42
[52] U.S. Cl. ....................... 363/33; 363/94; 363/110; 323/207; 323/228; 323/291
[58] Field of Search ................. 315/33 S; 363/32, 33, 363/76, 94, 109, 110; 323/207, 227, 228, 291

[56] References Cited

FOREIGN PATENT DOCUMENTS 2030801 3/1983 United Kingdom .

Primary Examiner—William H. Beha, Jr.
Assistant Examiner—Jeffrey Sterrett
Attorney, Agent, or Firm—Nixon and Vanderhye

[57] ABSTRACT

Disclosed is an Electrical Driving and Recovery System for a High Frequency environment. The recovery system can be applied to drive present day direct-current or alternating-current loads for better efficiency. It has a low-voltage source coupled to a vibrator, a transformer and a bridge-type rectifier to provide a high voltage pulsating signal to a first capacitor. Where a high-voltage source is otherwise available, it may be coupled directly to a bridge-type rectifier, causing a pulsating signal to the first capacitor. The first capacitor in turn is coupled to a high voltage anode of an electrical conversion switching element tube. The switching element tube also includes a low voltage anode which is connected to a voltage source by a commutator and a switching element tube. Mounted around the high voltage anode is a charge receiving plate which is coupled to an inductive load to transmit a high voltage discharge from the switching element tube to the load. Also coupled to the load is a second capacitor for storing the back EMF created by the collapsing electrical field of the load when the current to the load is blocked. The second capacitor is coupled to the voltage source. When adapted to present day direct-current or alternating-current devices the load could be a battery or capacitor to enhance the productivity of electrical energy.

8 Claims, 5 Drawing Figures

EFFICIENT POWER SUPPLY SUITABLE FOR INDUCTIVE LOADS

BACKGROUND OF THE INVENTION

1. Field of the Invention

The present invention relates to an electrical driving system and a conversion element, and more particularly, to a system for driving an inductive load in a greatly improved and efficient manner.

2. Description of the Prior Act

In the opinion of the inventor, there is no known device which provides the conversion of energy from a direct-current electric source or an alternating-current electric source to a mechanical force based on the principle of this invention. EXAMPLE: A portable energy source, (1) such as a battery, (2) such as alternating-current, (3) such as the combination of battery and alternating-current, may be used with highly improved efficiency to operate a mechanical device, whose output is a linear or rotary force, with an attendant increase in the useful productive period between external applications of energy restoration for the energy source.

SUMMARY OF THE INVENTION

The present invention provides a more efficient driving system comprising a source of electrical voltage; a vibrator connected to the low-voltage source for forming a pulsating signal; a transformer connected to the vibrator for receiving the pulsating signal; a high-voltage source, where available, connected to a bridge-type rectifier; or the bridge-type rectifier connected to the high voltage pulse output of the transformer; a capacitor for receiving the voltage pulse output; a conversion element having first and second anodes, electrically conductive means for receiving a charge positioned about the second anode and an output terminal connected to the charge receiving means, the second anode being connected to the capacitor; a commutator connected to the source of electrical voltage and to the first anode; and an inductive load connected to the output terminal whereby a high energy discharge between the first and second anodes is transferred to the charge receiving means and then to the inductive load.

As a sub-combination, the present invention also includes a conversion element comprising a housing; a first low voltage anode mounted to the housing, the first anode adapted to be connected to a voltage source; a second high voltage anode mounted to the housing, the second anode adapted to be connected to a voltage source; electrically conductive means positioned about the second anode and spaced therefrom for receiving a charge, the charge receiving means being mounted to the housing; and an output terminal communicating with the charge receiving means, said terminal adapted to be connected to an inductive load.

The invention also includes a method for providing power to an inductive load comprising the steps of providing a voltage source, pulsating a signal from said cource; increasing the voltage of said signal; rectifying said signal; storing and increasing the signal; conducting said signal to a high voltage anode; providing a low voltage to a second anode to form a high energy discharge; electrostatically coupling the discharge to a charge receiving element; conducting the discharge to an inductive load; coupling a second capacitor to the load; and coupling the second capacitor to the source.

It is an aim of the present invention to provide a system for driving an inductive load which system is substantially more efficient than any now existing.

Another object of the present invention is to provide a system for driving an inductive load which is reliable, is inexpensive and simply constructed.

The foregoing objects of the present invention together with various other objects, advantages, features and results thereof which will be evident to those skilled in the art in light of this disclosure may be achieved with the exemplary embodiment of the invention described in detail hereinafter and illustrated in the accompanying drawings.

DESCRIPTION OF THE PREFERRED EMBODIMENT

Figure 1:
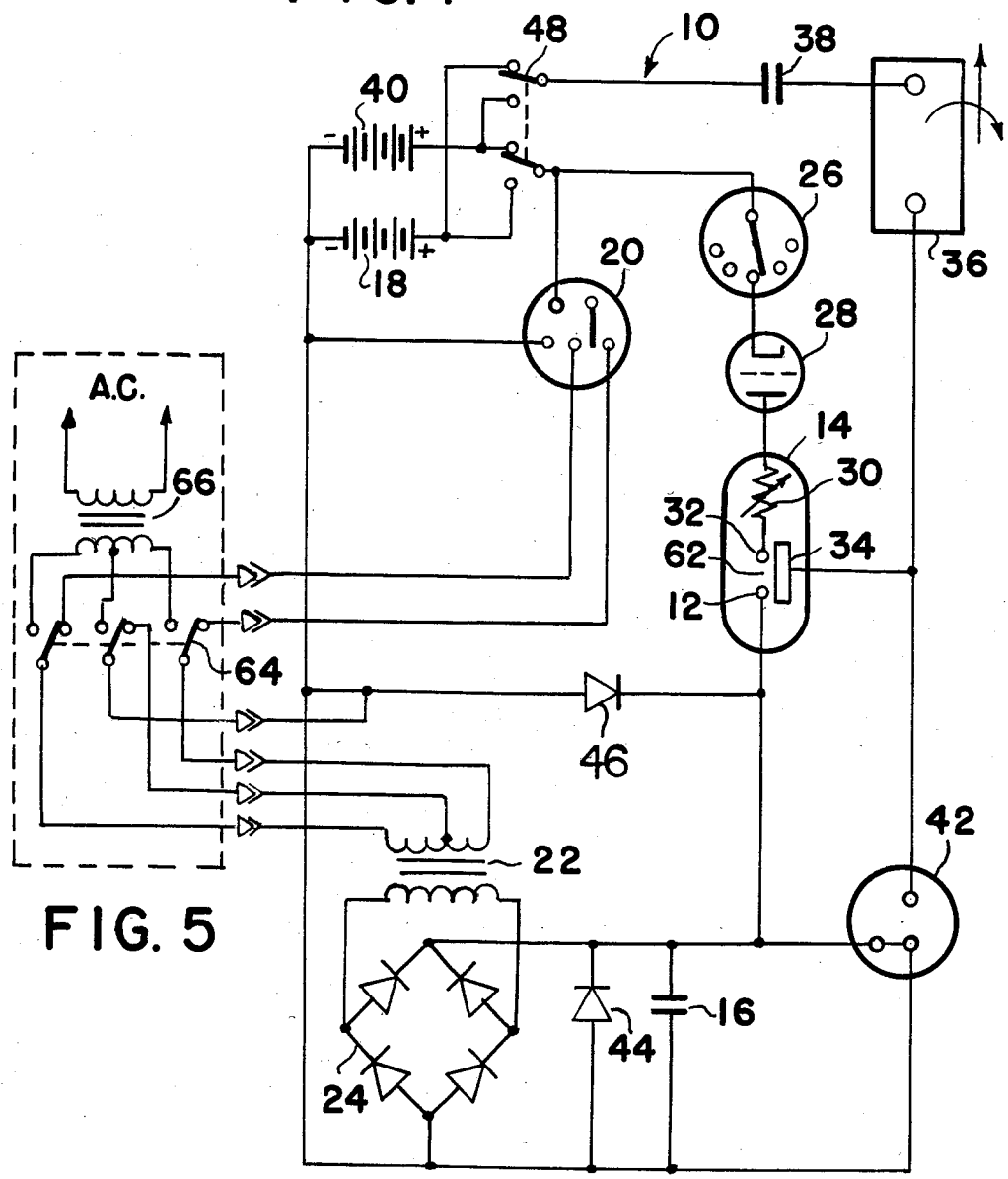
FIG. 1 is a schematic circuit diagram of the electrical driving system.
Figure 5:
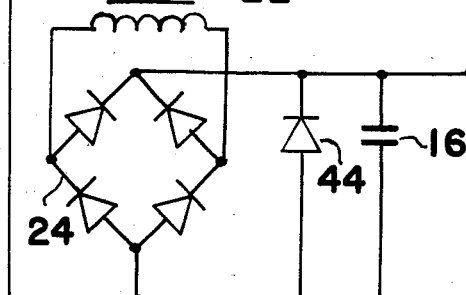
FIG. 5 is a schematic circuit diagram of the alternating-current input circuit.

While the present invention is susceptible of various modifications and alternative constructions, an embodiment is shown in the drawings and will herein be described in detail. It should be understood however that it is not the intention to limit the invention to the particular form disclosed; but, on the contrary, the invention is to cover all modifications, equivalents and alternative constructions falling within the spirit and scope of the invention as expressed in the appended claims.

There is disclosed herein an electrical driving system which, on theory, will convert low voltage electric energy from a source such as an electric storage battery to a high potential, high current energy pulse that is capable of developing a working force at the inductive output of the device that is more efficient than that which is capable of being developed directly from the energy source. The improvement in efficiency is further enhanced by the capability of the device to return that portion of the initial energy developed, and not used by the inductive load in the production of mechanical energy, to the same or second energy reservoir or source for use elsewhere, or for storage.

This system accomplishes the results stated above by harnessing the "electrostatic" or "impulse" energy created by a high-intensity spark generated within a specially constructed electrical conversion switching element tube. This element utilizes a low-voltage anode, a high-voltage anode, and one or more "electrostatic" or charge receiving grids. These grids are of a physical size, and appropriately positioned, as to be compatible with the size of the tube, and therefore, directly related to the amount of energy to be anticipated when the device is operating.

The low-voltage anode may incorporate a resistive device to aid in controlling the amount of current drawn from the energy source. This low-voltage anode is connected to the energy source through a mechanical commutator or a solid-state pulser that controls the timing and duration of the energy spark within the element. The high-voltage anode is connected to a high-voltage potential developed by the associated circuits. An energy discharge occurs within the element when the external control circuits permit. This short duration, high-voltage, high-current energy pulse is captured by the "electrostatic" grids within the tube, stored momentarily, then transferred to the inductive output load.

The increase in efficiency anticipated in converting the electrical energy to mechanical energy within the inductive load is attributed to the utilization of the most optimum timing in introducing the electrical energy to the load device, for the optimum period of time.

Further enhancement of energy conservation is accomplished by capturing a significant portion of the energy generated by the inductive load when the useful energy field is collapsing. This energy is normally dissipated in load losses that are contrary to the desired energy utilization, and have heretofore been accepted because no suitable means had been developed to harness this energy and restore it to a suitable energy storage device.

The present invention is concerned with two concepts or characteristics. The first of these characteristics is observed with the introduction of an energizing current through the inductor. The inductor creates a contrary force (counter-electromotive force or CEMF) that opposes the energy introduced into the inductor. This CEMF increases throughout the time the introduced energy is increasing.

In normal applications of an alternating-current to an inductive load for mechanical applications, the useful work of the inductor is accomplished prior to terminating the application of energy. The excess energy applied is thereby wasted.

Previous attempts to provide energy inputs to an inductor of time durations limited to that period when the optimum transfer of inductive energy to mechanical energy is occuring, have been limited by the ability of any such device to handle the high current required to optimize the energy transfer.

The second characteristic is observed when the energizing current is removed from the inductor. As the current is decreased, the inductor generates an EMF that opposes the removal of current or, in other words, produces an energy source at the output of the inductor that simulates the original energy source, reduced by the actual energy removed from the circuit by the mechanical load. This "regenerated", or excess, energy has previously been lost due to a failure to provide a storage capability for this energy.

In this invention, a high-voltage, high-current, short duration energy pulse is applied to the inductive load by the conversion element. This element makes possible the use of certain of that energy impressed within an arc across a spark-gap, without the resultant deterioration of circuit elements normally associated with high energy electrical arcs.

This invention also provides for capture of a certain portion of the energy induced by the high inductive kick produced by the abrupt withdrawal of the introduced current. This abrupt withdrawal of current is attendant upon the termination of the stimulating arc. The voltage spike so created is imposed upon a capacitor that couples the attendant current to a secondary energy storage device.

A novel, but not essential, circuit arrangement provides for switching the energy source and the energy storage device. This switching may be so arranged as to actuate automatically at predetermined times. The switching may be at specified periods determined by experimentation with a particular device, or may be actuated by some control device that measures the relative energy content of the two energy reservoirs.

Referring now to FIG. 1, the system 10 will be described in additional detail. The potential for the high-voltage anode, 12 of the conversion element 14 is developed across the capacitor 16. This voltage is produced by drawing a low current from a battery source 18 through the vibrator 20. The effect of the vibrator is to create a pulsating input to the transformer 22. The turns ratio of the transformer is chosen to optimize the voltage applied to a bridge-type rectifier 24. The output of the rectifier is then a series of high-voltage pulses of modest current. When the available source is already of the high voltage, AC type, it may be coupled directly to the bridge-type rectifier.

By repetitious application of these output pulses from the bridge-type recrifier to the capacitor 16, a high-voltage, high-level charge is built up on the capacitor.

Control of the conversion switching element tube is maintained by a commutator 26. A series of contacts mounted radially about a shaft, or a solid-state switching device sensitive to time or other variable may be used for this control element. A switching element tube type one-way energy path 28 is introduced between the commutator device and the conversion switching element tube to prevent high energy arcing at the commutator current path. When the switching element tube is closed, current from the voltage source 18 is routed through a resistive element 30 and a low voltage anode 32. This causes a high energy discharge between the anodes within the conversion switching element tube 14.

The energy content of the high energy pulse is electrostatically coupled to the conversion grids 34 of the conversion element. This electrostatic charge is applied through an output terminal 60 (FIG. 2) across the load inductance 36, inducing a strong electromagnetic field about the inductive load. The intensity of this electromagnetic field is determined by the high electromotive potential developed upon the electrostatic grids and the very short time duration required to develop the energy pulse.

If the inductive load is coupled magnetically to a mechanical load, a strong initial torque is developed that may be efficiently utilized to produce physical work.

Upon cessation of the energy pulse (arc) within the conversion switching element tube the inductive load is decoupled, allowing the electromagnetic field about the inductive load to collapse. The collapse of this energy field induces within the inductive load a counter EMF. This counter EMF creates a high positive potential across a second capacitor which, in turn, is induced into the second energy storage device or battery 40 as a charging current. The amount of charging current available to the battery 40 is dependent upon the initial conditions within the circuit at the time of discharge within the conversion switching element tube and the amount of mechanical energy consumed by the work load.

A spark-gap protection device 42 is included in the circuit to protect the inductive load and the rectifier elements from unduly large discharge currents. Should the potentials within the circuit exceed predetermined values, fixed by the mechanical size and spacing of the elements within the protective device, the excess energy is dissipated (bypassed) by the protective device to the circuit common (electrical ground).

Diodes 44 and 46 bypass the excess overshoot generated when the "Energy Conversion Switching Element Tube" is triggered. A switching element 48 allows either energy storage source to be used as the primary energy source, while the other battery is used as the energy retrieval unit. The switch facilitates interchanging the source and the retrieval unit at optimum intervals to be determined by the utilization of the conversion switching element tube. This switching may be accomplished manually or automatically, as determined by the choice of switching element from among a large variety readily available for the purpose.

Figure 2:
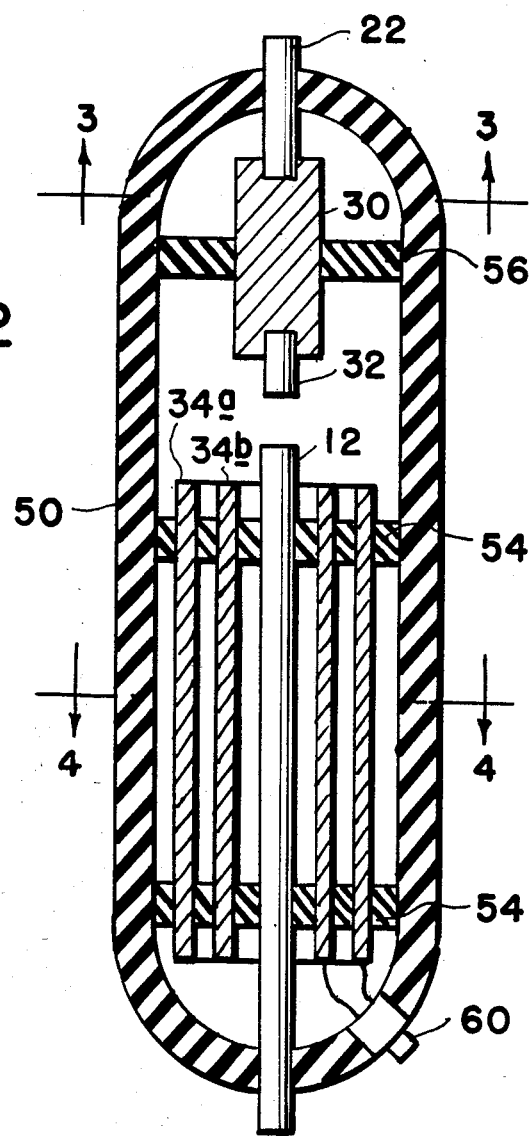
FIG. 2 is an elevational sectional view of the electrical conversion element.
Figure 3:
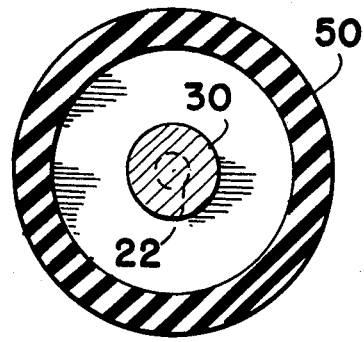
FIG. 3 is a plan sectional view taken along line 3—3 of FIG. 2.
Figure 4:
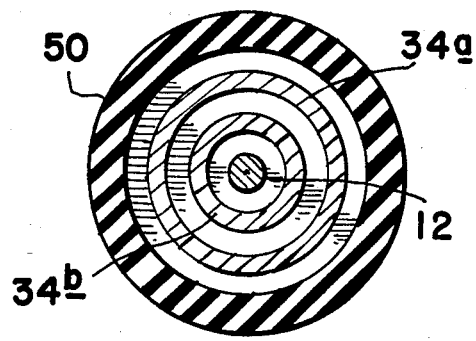
FIG. 4 is a plan sectional view taken along line 4—4 of FIG. 2.

FIGS. 2, 3, and 4 show the mechanical structure of the conversion switching element tube 14. An outer housing 50 may be of any insulative material such as glass. The anodes 12 and 22 and grids 34a and 34b are firmly secured by nonconductive spacer material 54, and 56. The resistive element 30 may be introduced into the low-voltage anode path to control the peak currents through the conversion switching element tube. The resistive element may be of a piece, or it may be built of one or more resistive elements to achieve the desired result.

The anode material may be identical for each anode, or may be of differing materials for each anode, as dictated by the most efficient utilization of the device, as determined by appropriate research at the time of production for the intended use.

The shape and spacing of the electrostatic grids is also susceptible to variation with application (voltage, current, and energy requirements).

It is the contention of the inventor that by judicious mating of the elements of the conversion switching element tube, and the proper selection of the components of the circuit elements of the system, the desired theoretical results may be achieved. It is the inventor's contention that this mating and selection process is well within the capabilities of intensive research and development technique.

Let it be stated here that substituting a source of electric alternating-current subject to the required current and/or voltage shaping and/or timing, either prior to being considered a primary energy source, or thereafter, should not be construed to change the described utilization or application of primary energy in any way. Such energy conversion is readily achieved by any of a multitude of well established principles. The preferred embodiment of this invention merely assumes optimum utilization and optimum benefit from this invention when used with portable energy devices similar in principle to the wet-cell or dry-cell battery.

This invention proposes to utilize the energy contained in an internally generated high-voltage electric spike (energy pulse) to electrically energize an inductive load; this inductive load being then capable of converting the energy so supplied into a useful electrical or mechanical output.

In operation the high-voltage, short-duration electric spike is generated by discharging the capacitor 16 across the spark-gap in the conversion switching element tube. The necessary high-voltage potential is stored on the capacitor in incremental, additive steps from the bridge-type rectifier 24.

When the energy source is a direct-current electric energy storage device, such as the battery 12, the input to the bridge rectifier is provided by the voltage step-up transformer 22, that is in turn energized from the vibrator 20, or solid-state chopper, or similar device to properly drive the transformer and rectifier circuits.

When the energy source is an alternating-current, switches 64 disconnect transformer 22 and the input to the bridge-type rectifier 24 is provided by the voltage step-up transformer 66, that is in turn energized from the vibrator 20, or solid-state chopper, or similar device to properly drive the transformer and rectifier circuits.

The repetitions output of the bridge rectifier incrementally increases the capacitor charge toward its maximum. This charge is electrically connected directly to the high-voltage anode 12 of the conversion switching element tube.

When the low-voltage anode 32 is connected to a source of current, an arc is created in the spark-gap designated 62 of the conversion switching element tube equivalent to the potential stored on the high-voltage anode, and the current available from the low-voltage anode. Because the duration of the arc is very short, the instantaneous voltage, and instantaneous current may both be very high. The instantaneous peak apparent power is therefore, also very high. Within the conversion switching element tube, this energy is absorbed by the grids 34a and 34b mounted circumferentially about the interior of the tube.

Control of the energy spike within the conversion switching element tube is accomplished by a mechanical, or solid-state commutator, that closes the circuit path from the low-voltage anode to the current source at that moment when the delivery of energy to the output load is most auspicious. Any number of standard high-accuracy, variable setting devices are available for this purpose. When control of the repetitive rate of the system's output is required, it is accomplished by controlling the time of connection at the low-voltage anode.

Thus there can be provided an electrical driving system having a low-voltage source coupled to a vibrator, a transformer and a bridge-type rectifier to provide a high voltage pulsating signal to a first capacitor. Where a high-voltage source is otherwise available, it may be coupled direct to a bridge-type rectifier, causing a pulsating signal to a first capacitor. The capacitor in turn is coupled to a high-voltage anode of an electrical conversion switching element tube. The element also includes a low-voltage anode which in turn is connected to a voltage source by a commutator, a switching element tube, and a variable resistor. Mounted around the high-voltage anode is a charge receiving plate which in turn is coupled to an inductive load to transmit a high-voltage discharge from the element to the load. Also coupled to the load is a second capacitor for storing the back EMF created by the collapsing electrical field of the load when the current to the load is blocked. The second capacitor in turn is coupled to the voltage source.

What is claimed is:

1. An electrical driving system comprising:
   a source of electrical voltage;
   a vibrator connected to said source for forming a pulsating signal;
   a transformer connected to said vibrator for receiving said pulsating signal;
   a rectifier connected to said transformer having a high-voltage pulse output;
   a capacitor for receiving said voltage pulse output;

a conversion switching element tube having first and second anodes, electrically conductive means for receiving a charge positioned about said second anode and an output terminal connected to said charge receiving means, said second anode being connected to said capacitor;

a commutator connected to said source of electrical voltage and to said first anode; and an inductive load connected to said output terminal whereby a high energy discharge between said first and second anodes is transferred to said charge receiving means and then to said inductive load.

2. A system as claimed in claim 1, including
a second capacitor for receiving a charge from said load.

3. A system as claimed in claim 2, including
a switching element tube positioned in series between said commutator and said first anode.

4. A system as claimed in claim 3, including
a second source of voltage and a switch for receiving a signal from said second capacitor.

5. A system as claimed in claim 4 wherein:
said conversion switching element tube includes a resistive element in series with said first anode; and
said charge receiving means is tubularly shaped.

6. A system as in claim 1 wherein said source comprises a direct current source and wherein said system further comprises:
a source of alternating current; and
a switch means for selecting said direct-current or said alternating-current power source as input to said rectifier.

7. A system as in claim 1 wherein said rectifier comprises a bridge-type rectifier.

8. A method for providing power to an inductive load comprising the steps of
providing a voltage source;
pulsating a signal from said source;
increasing the voltage of said signal;
rectifying said signal;
storing and increasing said signal;
conducting said signal to a high-voltage anode;
providing a low-voltage to a second anode to form a high energy discharge;
electrostatically coupling said discharge to a charge receiving element;
conducting said discharge to an inductive load;
coupling a second capacitor to said load; and
coupling said capacitor to said source.

* * * * *